(12) United States Patent
Omidi

(10) Patent No.: US 11,577,546 B2
(45) Date of Patent: Feb. 14, 2023

(54) APPARATUS FOR REMOVING LUG NUTS ON A VEHICLE TIRE

(71) Applicant: Rayan Omidi, Katy, TX (US)

(72) Inventor: Rayan Omidi, Katy, TX (US)

( * ) Notice: Subject to any disclaimer, the term of this patent is extended or adjusted under 35 U.S.C. 154(b) by 206 days.

(21) Appl. No.: 17/068,688

(22) Filed: Oct. 12, 2020

(65) Prior Publication Data

US 2021/0402826 A1 Dec. 30, 2021

Related U.S. Application Data

(63) Continuation-in-part of application No. 16/914,464, filed on Jun. 28, 2020, now Pat. No. 10,800,207.

(51) Int. Cl.
*B60B 29/00* (2006.01)
*B25B 23/16* (2006.01)
*B25B 13/06* (2006.01)

(52) U.S. Cl.
CPC ............ *B60B 29/003* (2013.01); *B25B 13/06* (2013.01); *B25B 23/16* (2013.01)

(58) Field of Classification Search
CPC ........ B60B 29/003; B25B 13/06; B25B 23/16
See application file for complete search history.

(56) References Cited

U.S. PATENT DOCUMENTS

| | | | |
|---|---|---|---|
| 1,741,810 A | 12/1929 | Bidal | |
| 5,218,730 A | 10/1993 | Mellin | |
| 5,431,074 A | 7/1995 | Durante | |
| 5,456,278 A | 10/1995 | Morris et al. | |
| 8,286,535 B1 | 10/2012 | McCaratney | |
| 8,474,353 B1 | 7/2013 | Thoman | |
| 10,800,207 B1 * | 10/2020 | Omidi | .............. B25G 1/005 |
| 2016/0060983 A1 | 3/2016 | Hamed | |
| 2017/0253080 A1 | 9/2017 | Klien | |

FOREIGN PATENT DOCUMENTS

WO WO0168325 A1 9/2001

OTHER PUBLICATIONS

The International Search Report and the Written Opinion of the International Searching Authority, or the Declaration for International Application No. PCT/US2021/039292, dated Sep. 2, 2021.

* cited by examiner

*Primary Examiner* — David B. Thomas
(74) *Attorney, Agent, or Firm* — Brett A. Schenck

(57) ABSTRACT

An apparatus for removing lug nuts for changing a tire on a vehicle has a bracing structure and at least three arms connected to the bracing structure. A first arm extends upward and a second arm, adapted to operate as a footrest, extends outward and both arms are positioned such that one may stand on the second arm to generate extra torque while grasping the first arm for stability. A third arm is adapted to receive a socket and is oriented along the socket's axis of rotation. All arms are collapsible for storage.

20 Claims, 11 Drawing Sheets

APPARATUS FOR REMOVING LUG NUTS ON A VEHICLE TIRE

CROSS-REFERENCE TO RELATED APPLICATIONS

This application is a continuation-in-part of application Ser. No. 16/914,464, filed on Jun. 28, 2020, which is hereby incorporated by reference in its entirety.

BACKGROUND OF THE INVENTION

1. Field of the Invention

The present invention relates to tools for servicing vehicle wheels, and particularly, to lug wrenches for loosening lug nuts for removing vehicle wheels and for tightening lug nuts in installing vehicle wheels.

2. Description of Relevant Art

Flat tires can occur while driving, requiring a person to change the tire on a roadside, perhaps on the way to an appointment and/or during inclement or unpleasant weather. At such times, the driver or passenger most able to change a tire may be dressed in clothing unsuitable for changing a flat tire. Moreover, often a person removing a vehicle wheel must apply a significant amount of torque using a wrench to remove lug nuts that are securing the wheel to the vehicle axle. Such removal can be more difficult when the lug nuts have not been removed recently and/or when the roadside environment prevents sure footing to the person, such as when the roadside is muddy, rocky, wet, or sloped.

To compensate for this lack of torque, many people will stand on the wrench attempting to use their full bodyweight, sometimes even jumping on the wrench, to generate even more force. However, such actions are unsafe and can lead to serious injury. Maintaining balance on a lug wrench while still engaging the wheel's lug nuts is difficult. In inclement weather, balance is even more difficult to maintain as the wrench and nuts become slippery. A fall on the side of a road can be very dangerous, not just to the person attempting to change the tire, but to other motorists who must dodge a person who slips into a lane of traffic.

Many automobile manufacturers supply lug or socket wrenches for loosening and tightening lug nuts to facilitate changing of vehicle tires. Lug wrenches supplied with a vehicle are often substantially L-shaped with a socket at the end of the base of the L adapted to receive the head of the lug nut or wheel nut. The leg of the L is typically of a length to permit a person to apply a levered force to the socket towards tightening or loosening the lug nut. Such a wrench is usually applied by holding the socket end of the wrench on the lug nut with one hand and applying pressure on the other, typically flattened, end with the other hand.

However, auto manufacturers are often supplying a shorter lug wrench in the interest of saving space. This lessens the amount of torque that can be applied. Further, auto mechanics can often apply more torque to a lug nut than many people can readily apply to a conventional lug wrench, particularly in less than ideal situations and/or conditions. Therefore, the torque required to loosen the lug nuts is sometimes too much for many people to generate with the lug wrench supplied by the auto manufacturers.

Accordingly, several alternative lug wrenches have been developed in an effort to make it easier for a person to loosen or tighten the lug nuts. One type of alternative wrench commonly seen is a so-called cross wrench having two rod bars affixed together at a center point, with the four ends having sockets of varying sizes. This four-way lug wrench has at least two advantages over the L-shaped wrench described above. First, the four-way wrench enables the user to apply a more even force on the wrench with two hands. Second, up to four different socket sizes are available on the wrench, and thus the wrench can be applied to at least four different sizes of lug nuts. However, a typical cross wrench takes up considerably more space in the storage area of a vehicle that the L-shaped wrench. Lastly, this wrench fails to enable a person to use the force of his or her foot/leg or bodyweight while simultaneously grasping the wrench to support themselves while safely maintaining their balance.

U.S. Pat. No. 5,201,257 (Engel) describes a folding lug wrench with a socket stub pivotally attached to a handle. The socket stub can be pivoted and stored in the handle when not in use. In operation, the Engel folding lug wrench appears to suffer from the same drawbacks as the L-shaped wrench. The user is not always able to apply sufficient torque to loosen and/or tighten lug nuts.

The lug nut wrench described in U.S. Pat. No. 5,218,730 (Berry) has collapsible inner and outer tubes. A rod extends perpendicularly at one end of the inner tube, the rod having a tapered point for prying a wheel cover from the wheel prior to loosening the lug nuts. The wrench also has a sleeve that travels over the outer tube to the end opposite the pry rod. The sleeve has a shank for engaging a socket for loosening lug nuts. While this device is collapsible, it still suffers from the drawback of requiring more force from the user than the user can always provide.

U.S. Pat. No. 5,613,411 (Rines) relates to a tool for breaking loose lug nuts having a triangular support plate with holes to receive one end of an extension bar. The other end of the extension bar has a socket. A perpendicular arm is mounted to the extension bar and has a pad at the end thereof for applying force by foot or hand.

U.S. Pat. No. 7,080,580B2 (Gordon) describes a cross wrench having T-shaped handles extending outwardly from the center post of the cross wrench to improve the ergonomics of using a cross wrench. However, while this design has two arms extending outwardly from the center post, the user cannot use his or her feet and bodyweight on one arm of the wrench for increased torque while simultaneously grasping the other arm of the wrench for stability.

U.S. Pat. No. 5,685,207 (Hubert) addresses the space issue of a cross wrench by providing a multi-purpose wrench tool having an enlarged middle section with a cylindrical bore for receiving a leverage bar, thereby producing a cross wrench tool that can be collapsed into the two basic rod sections. Likewise, U.S. Pat. No. 6,662,688 B1 (Avery) describes a foldable cross wrench that can be collapsed when not in use.

U.S. Pat. No. 6,662,692 B2 (Anderson et al) illustrates a support structure for holding one end of a cross wrench. The cross wrench can be used with a hollow extension bar that slides over one of the cross bars of the cross wrench to apply more torque to the cross wrench.

U.S. Pat. No. 8,286,535 B1 (McCartney) teaches an L-shaped lug wrench having a step pad at the distal end of the L opposite the socket end, for allowing a user to step on the step pad to apply more torque to the wrench. U.S. Patent Application Publication No. 20100000377A1 (Barks, SR.) describes a similar tool.

A number of different configurations of lug wrenches are shown in U.S. Pat. No. 6,257,104 B1 (Jarrett), including L-shaped, S-shaped and T-shaped wrenches. A lever bar at the top of the T-shape has a socket stub at one end and a chisel-shaped wheel trim removal tool at the other end. A torque bar is connected to the lever bar for applying force. In use, the T-shaped wrench is effectively used in the same manner as the typical L-shaped lug wrench.

U.S. Pat. No. 6,748,832 B1 (Maxwell) addresses the leverage issue of L-shaped lug wrenches by supplying an adjustable stand with a clamp for holding an L-shaped wrench with an elongated handle.

However, all of these solutions still suffer from drawbacks; many people would still find it difficult to apply enough torque to loosen a lug nut with each of them. For most of the solutions, a person is often in an uncomfortable and often even awkward position leaning over the lug wrench to apply torque. Additionally, these solutions do not safely and securely allow the user to use his or her foot to aid in generating enough torque. These solutions do not allow the user to stabilize operation of the tool by grasping the wrench while simultaneously using his or her foot and bodyweight for extra torque. This is particularly problematic when a person has a sore or weak back. Other devices are cumbersome to store in the limited space available in vehicles. And still others are difficult to use from a balance perspective, especially in less than ideal roadside environments.

There is a need for a lug wrench that enables a person to apply enough torque to a lug nut to loosen the nuts for removing a vehicle wheel and/or to tightening the nuts for installing a spare, new or serviced wheel to the vehicle. There is also a need for a lug wrench that is easier to use from a bending and balancing perspective. There is also a need for a lug wrench that requires only a minimal amount of space in a storage area of a vehicle.

SUMMARY OF THE INVENTION

In present invention provides an apparatus that satisfies the need to loosen or tighten lug nuts of an automobile or vehicle wheel utilizing the extra torque generated through the user's using his or her foot while maintaining personal stability at the same time. The apparatus comprises: a bracing structure, a first arm, a second arm, and a third arm. Each arm has a proximal end and a distal end; the proximal end of each arm connects to the bracing structure and each arm's distal end is opposite the respective proximal end.

According to a preferred embodiment of the invention, the three arms collapse into a compact form for storage. In use, the first arm extends upward from the bracing structure, and the second arm, which is connected to the bracing structure with a swivel/pivot mechanism, swings out from the bracing structure. The third arm extends downward from the bracing structure and has a fourth arm which in one embodiment is removable and in another embodiment folds within the third arm when not in use. The fourth arm has an attachment for removing or loosening lug nuts. In some embodiments, this removable fourth arm, when not in use, can nest inside the third arm. The first arm is preferably or at least in one embodiment made of c-channel, and it's distal end swivels/pivots to collapse into the void space in the arm's c-channel. Additionally, the second arm is fitted with a platform to receive a user's foot so that the user can stand his or her foot firmly upon that second arm to generate torque while grasping the first arm during operation of the apparatus for loosening lug nuts.

BRIEF DESCRIPTION OF THE DRAWINGS

The apparatus of the present invention will be better understood by referring to the following detailed description of preferred embodiments and the drawings referenced therein, in which.

DETAILED DESCRIPTION OF THE INVENTION

The present invention provides an apparatus for removing lug nuts from a wheel 82 (FIG. 16) on a vehicle for changing a tire on that vehicle wheel. More specifically, the apparatus is used for loosening lug nuts from a vehicle wheel to facilitate removal of a tire on that wheel, whether the lug nuts are ultimately removed using the apparatus or manually removed once loosened with the apparatus of the present invention. The apparatus can also be used for tightening lug nuts to a wheel when installing a spare tire or a new or serviced wheel and/or tire.

Figure 4:
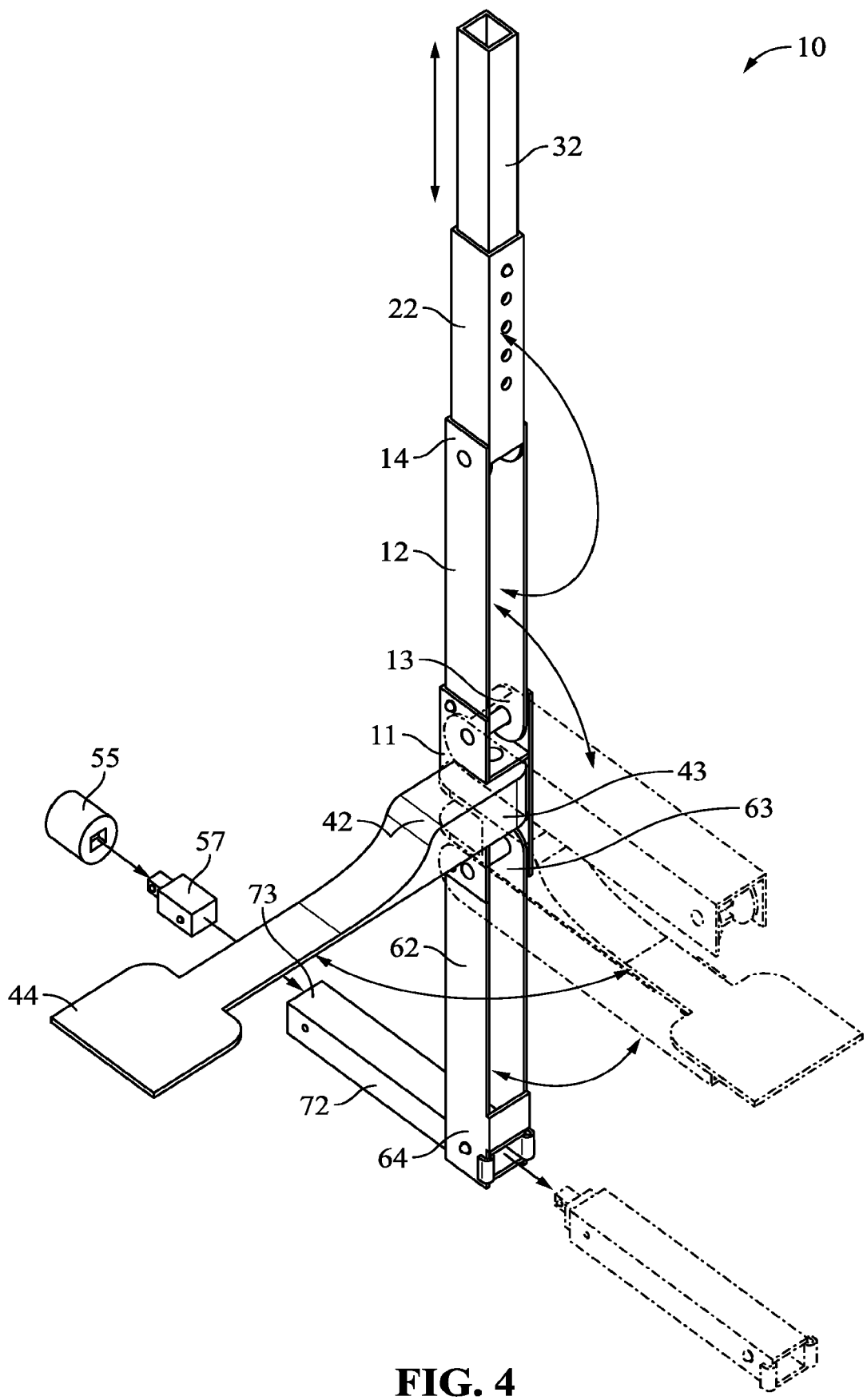
FIG. 4 is an isometric, side perspective view of the apparatus of FIG. 1 in a fully extended position as it would be ready for use, but also showing directions the arms of the apparatus move to unfold and position to be ready for use or to fold to be ready for storage.

Those skilled in the art understand that some vehicles have lug bolts instead of lug nuts for holding tires on wheels. The operation of lug wrenches, however, does not change significantly whether lug nuts or lug bolts are used. Accordingly, for ease of discussion herein, reference will be made only to lug nuts, but is intended to include lug bolts as well Referring now to the Figures, an apparatus 10 of one embodiment of the present invention has a bracing structure 11 and at least a first arm 12, a second arm 42, and a third arm 62. In the fully extended position shown in FIG. 4, the first arm 12 extends upward from the bracing structure 11, while the third arm 62 extends downward from the bracing structure 11 and the second arm 42 extends outward and laterally from the bracing structure 11. Arm 12 has a proximal end 13 and a distal end 14; arm 42 has a proximal end 43 and a distal end 44; and arm 62 has a proximal end 63 and a distal end 64. The proximal ends 13, 43, and 63 are connected to the bracing structure 11. The distal end 14 of arm 12 has connected thereto and folded within arm 12, and extendable upward from the distal end 14, another arm 22 which in turn has a telescoping arm 32 within arm 22, as shown in FIG. 4. Arms 22 and 32 extend the height of the apparatus 10 for comfort and better leverage for the user of the apparatus 10

Figure 1:
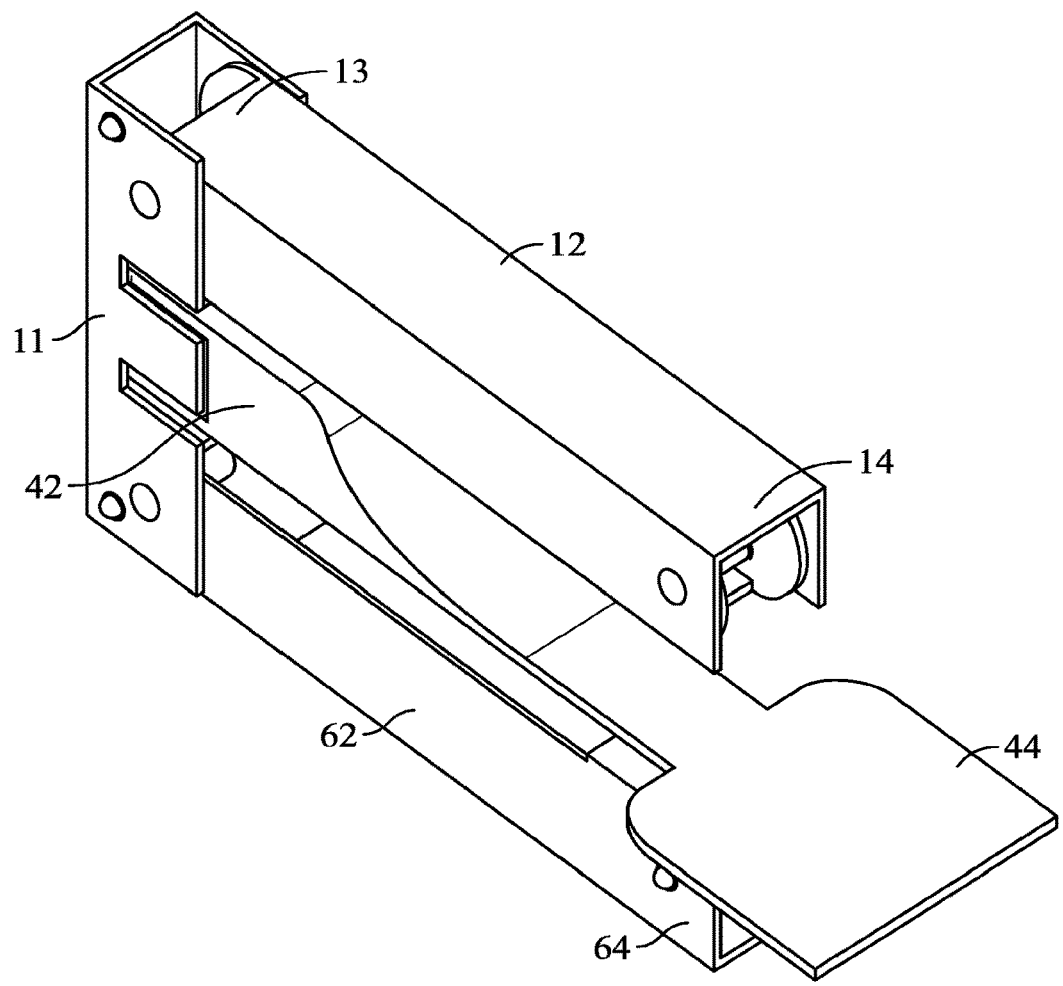
FIG. 1 is an isometric, side perspective view of one embodiment of the apparatus of the present invention showing its three primary arms in a collapsed position, ready for storing.
Figure 2:
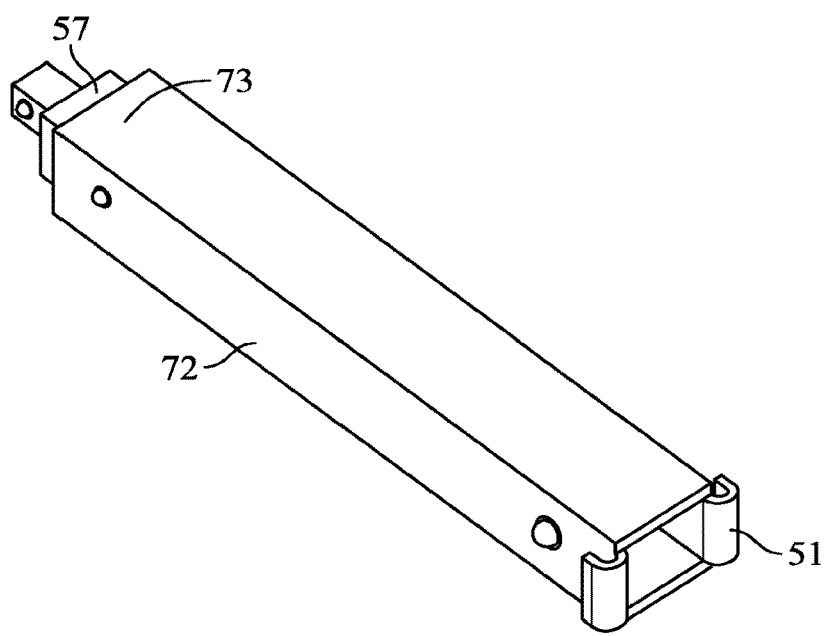
FIG. 2 is an isometric, side perspective view of a fourth arm attachable to the apparatus of FIG. 1.
Figure 3:
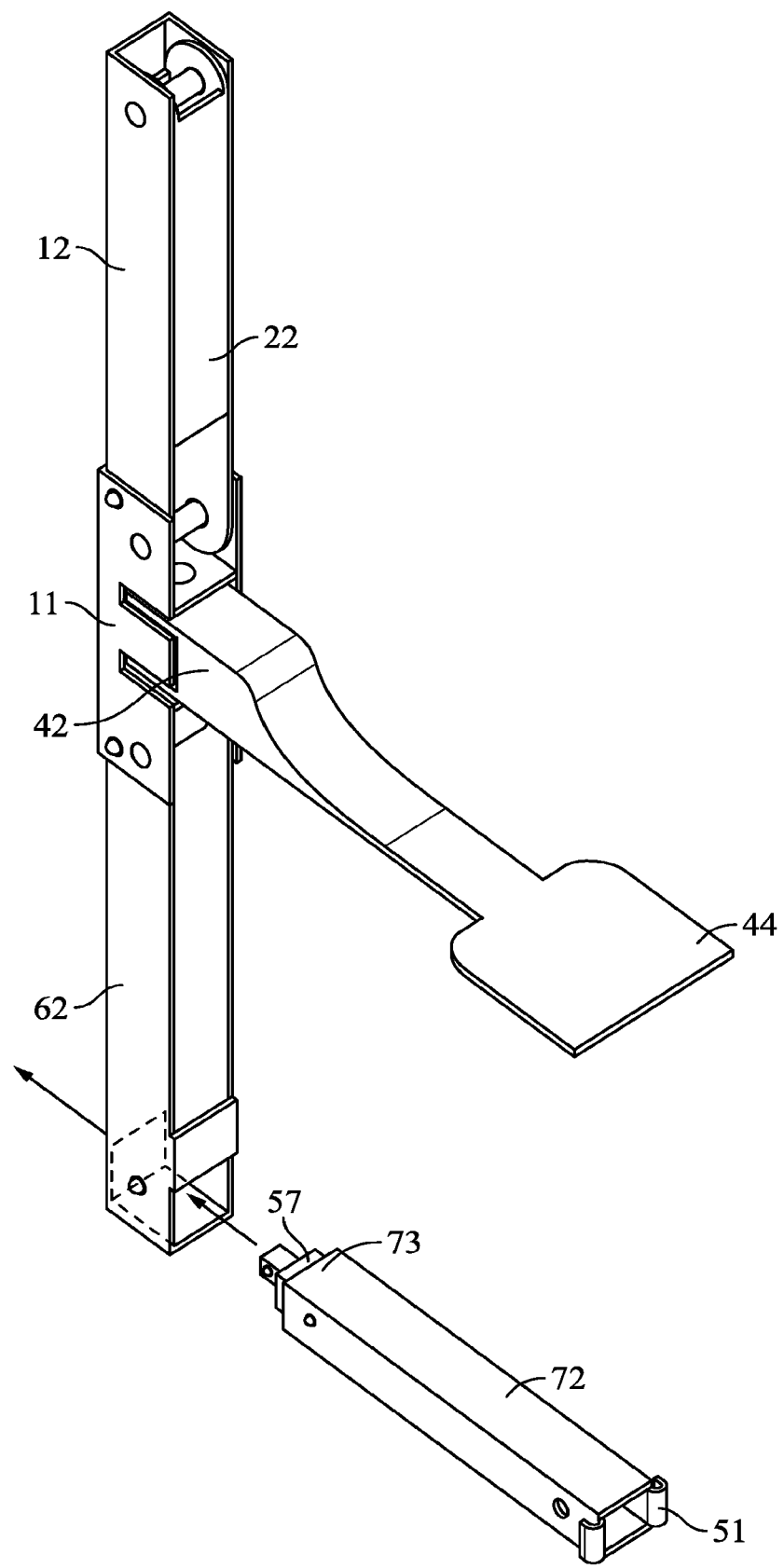
FIG. 3 is an isometric, side perspective view of the apparatus of FIG. 1, partially unfolded and assembled for use, with a first and second and third arm extended out from a bracing structure and a fourth arm of FIG. 2 being shown for insertion into the distal end of the third arm.

As shown in FIGS. 1, 3 and 4, arm 62 has foldable or insertable within it an arm 72 shown in FIG. 1 which at its distal end 73 is socketed or fitted with a connector 57 to engage a removable socket or lug nut 55. Connector 57 can itself be changeable or can be fitted with an adapter for different sized lug nuts. The arm 72 has a length ranging from one inch to thirty inches.

FIGS. 3 and 4 illustrate that arm 42 swings outward from the bracing structure 11 and has a distal end 44 that is flat and sufficiently broad as to provide a platform to hold or support a foot of the user of the apparatus 10. FIG. 4 shows that arms 12, 42, 62, 22, 32, and 72 are positioned relative to each other such that when in operation, a user's foot may be placed on the distal end 44 of arm 42 to generate more torque while simultaneously grasping the arm 32 for stability.

Figure 14:
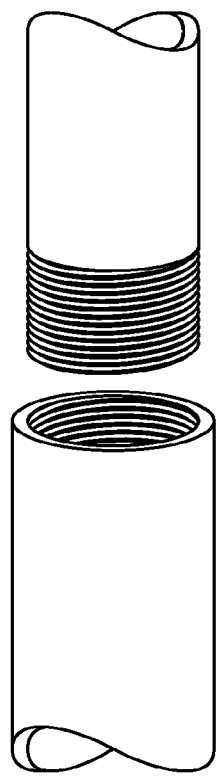
Figure 15:
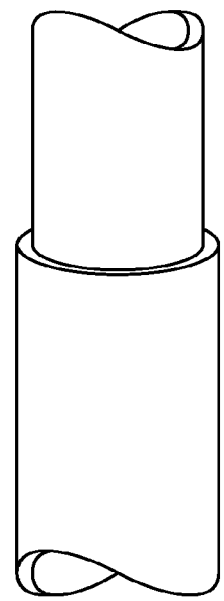

As illustrated in the Figures, all of the arms of the apparatus of the invention fold, telescope or are collapsible or removable. In the embodiment exampled in FIGS. 1, 3, and 4, the proximal end 13 of arm 12, the proximal end 43 of arm 42, and the proximal end 63 of arm 64 each are connected via a swivel/pivot mechanism to the bracing structure 11. Arm 22 contains a swivel/pivot mechanism that allows its distal end to collapse and rest inside arm 12. Arm 32 can telescope via a telescoping mechanism into arm 22. One skilled in the art will appreciate that a swivel/pivot connection can be accomplished by common mechanisms that allow rotation of one part relative to another, including but not limited to a pin connection, hinge, bearing, and/or flexible material. The second extension arm has a length ranging from one inch to thirty inches Also as illustrated in the FIGS. 1-4, in one embodiment, that is, apparatus 10, arm 72 is removable. Other arms could be made removable in alternative embodiments as well. In such an alternative embodiment, an arm can be attached by a threaded connection and removed by unscrewing the arm, as illustrated in FIGS. 14 and 15. In the embodiment exampled in FIGS. 1 to 4, arm 72 connects to arm 62 by entering through a hole in the distal end 64 of arm 62. A backstop 51 prevents the distal end 73 from passing through the arm 62. One skilled in the art will know of several common methods for removing and reattaching components, including but not limited to a pin, slot and pin, screw, and/or cantilever.

Figure 5:
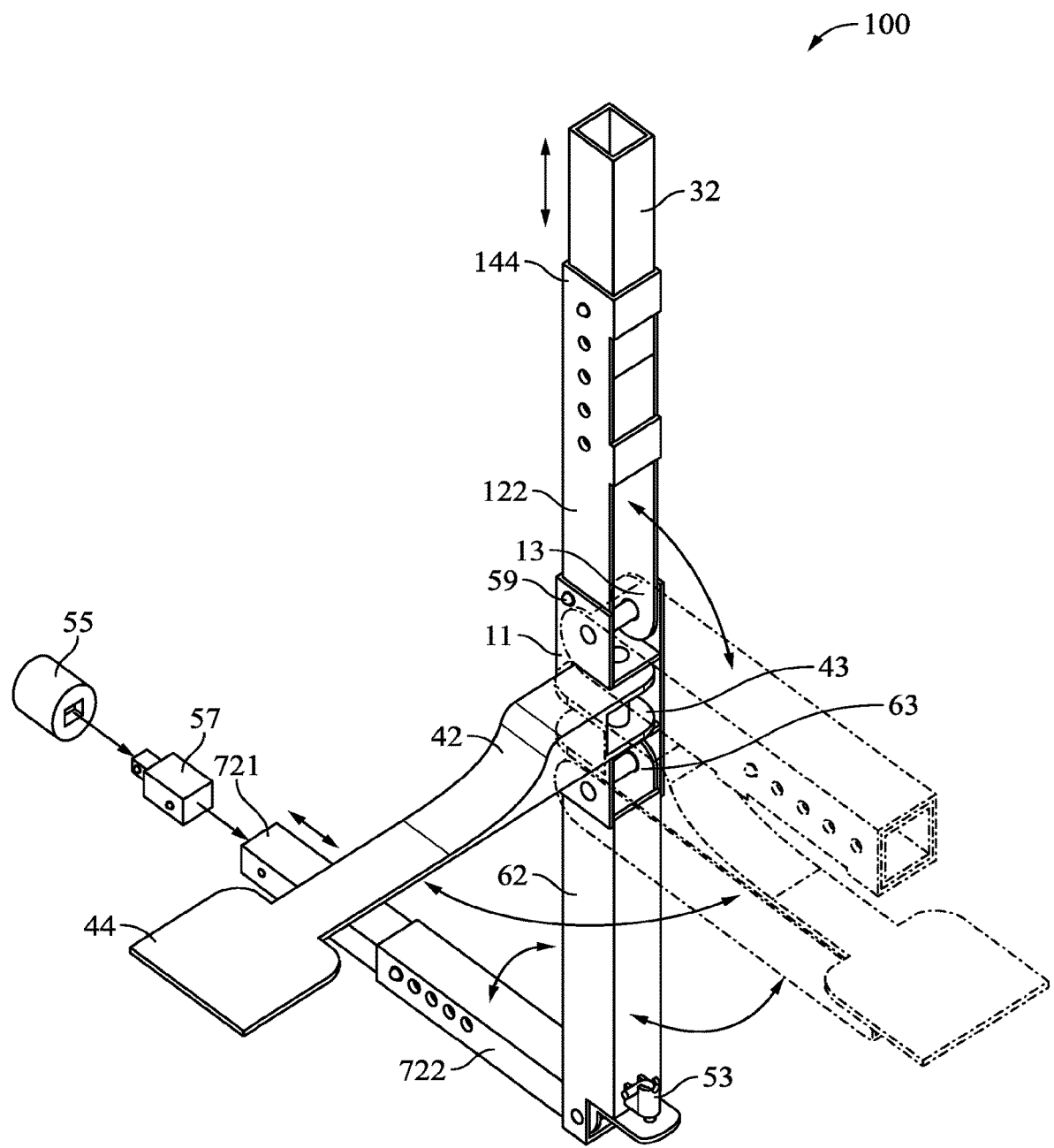
FIG. 5 provides an isometric side perspective view of an alternative embodiment of the apparatus of the invention wherein the fourth arm is connected to the third arm by a joint with a pin latch and the first arm has an extension arm that serves as a handle that extends telescopically from the first arm.
Figure 6:
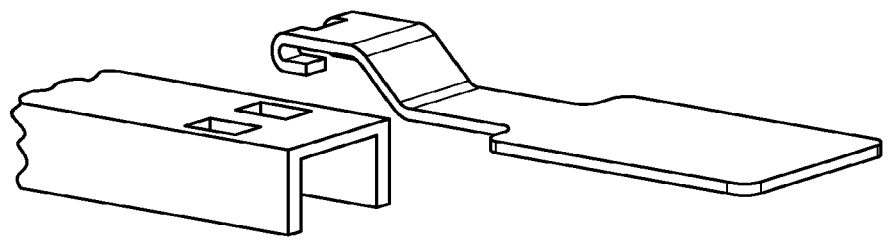
FIGS. 6, 7, and 8, FIGS. 9, 10, and 11, FIGS. 12 and 13, and FIGS. 14 and 15, show four different and alternative examples of connections that can be used for connecting arms of the apparatus of the invention to other arms or to the bracing structure of the invention.
Figure 7:
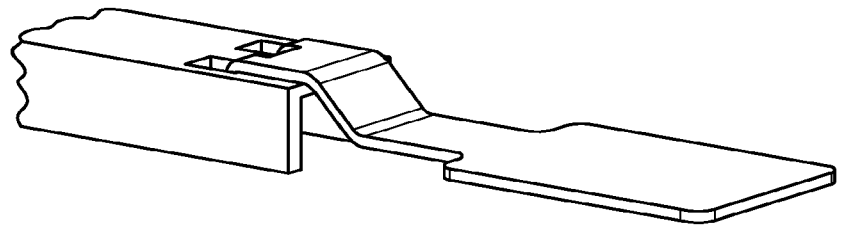
Figure 8:
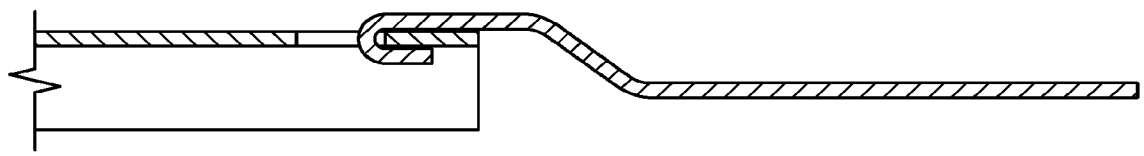
Figure 9:
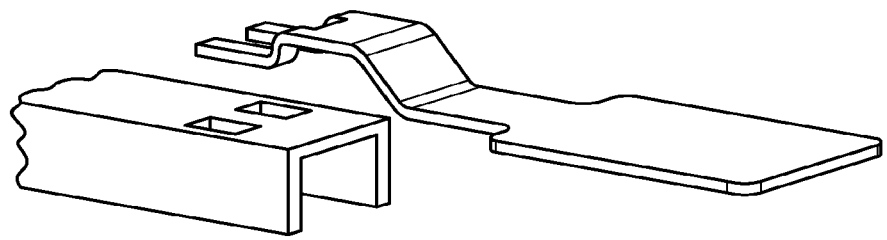
Figure 10:
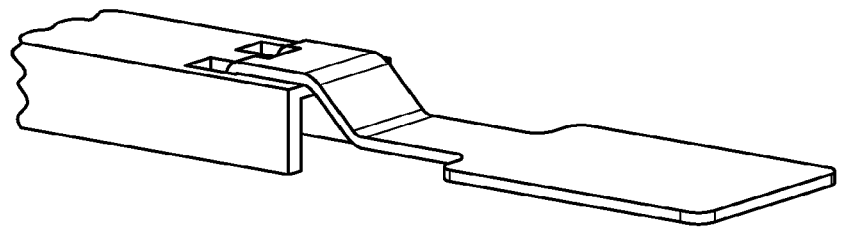
Figure 11:
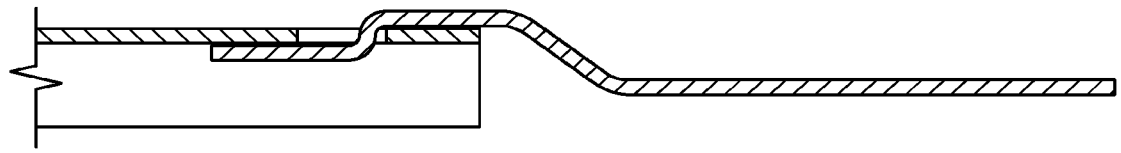
Figure 12:
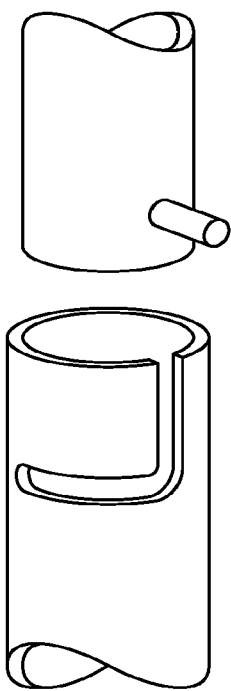
Figure 13:
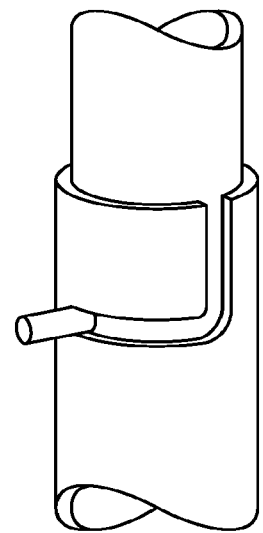
Figure 20:
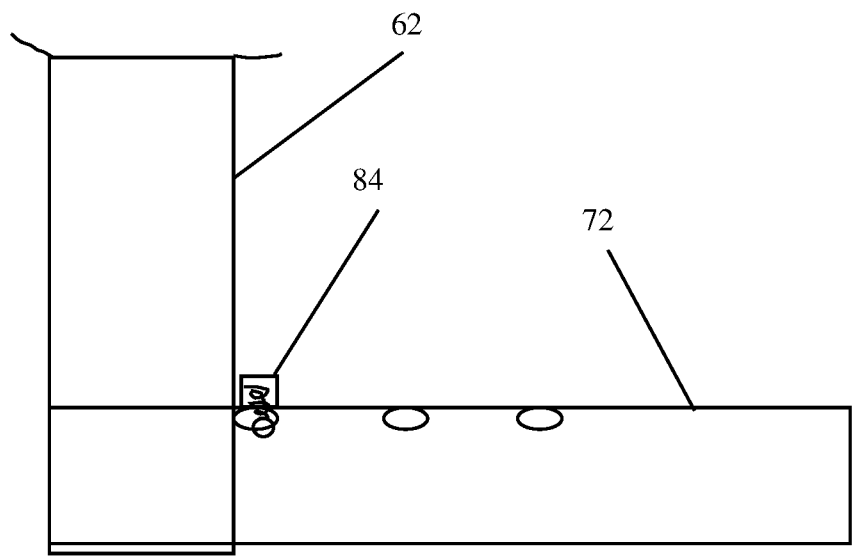
FIG. 20 is a side schematic view of a portion of the present invention showing a ball bearing locking mechanism for holding two arms in place when the apparatus is being used to remove the wheel with portions removed away for illustrative purposes.

In some embodiments, a locking mechanism, such as for example 53 in FIG. 5, can be used to lock one or more arms and/or distal ends into one or more positions and prevent movement during use. One skilled in the art will know of several common locking mechanisms to temporarily secure the position of moveable parts, including but not limited to a ball and detent, locking pin, and/or set screw. Additionally, some embodiments include a backstop to prevent over rotation of an arm and/or distal end. In the embodiments shown in the Figures, the arms are held in place when unfolded and extended as shown in FIGS. 3 and 4 with a ball bearing locking mechanism. FIG. 20 shows a spring loaded ball bearing locking mechanism 84 that holds the arms 62, 72 in place when the apparatus is being used to remove the wheel 82.

Figure 21:
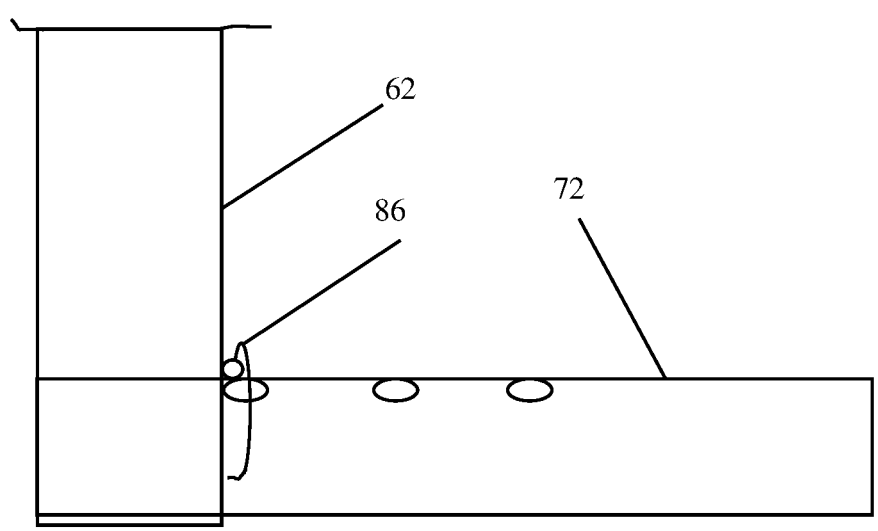
FIG. 21 is a side schematic view of a portion of the present invention showing a spring clip locking mechanism for holding two arms in place when the apparatus is being used to remove the wheel with portions removed away for illustrative purposes.
Figure 22:
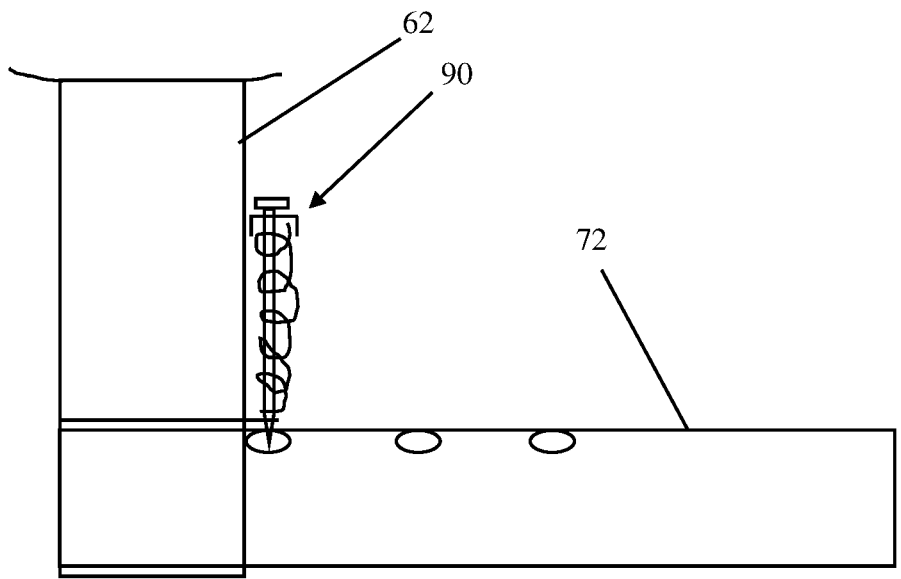
FIG. 22 is a side schematic view of a portion of the present invention showing pin and spring locking mechanism for holding two arms in place when the apparatus is being used to remove the wheel with portions removed away for illustrative purposes.
Figure 23:
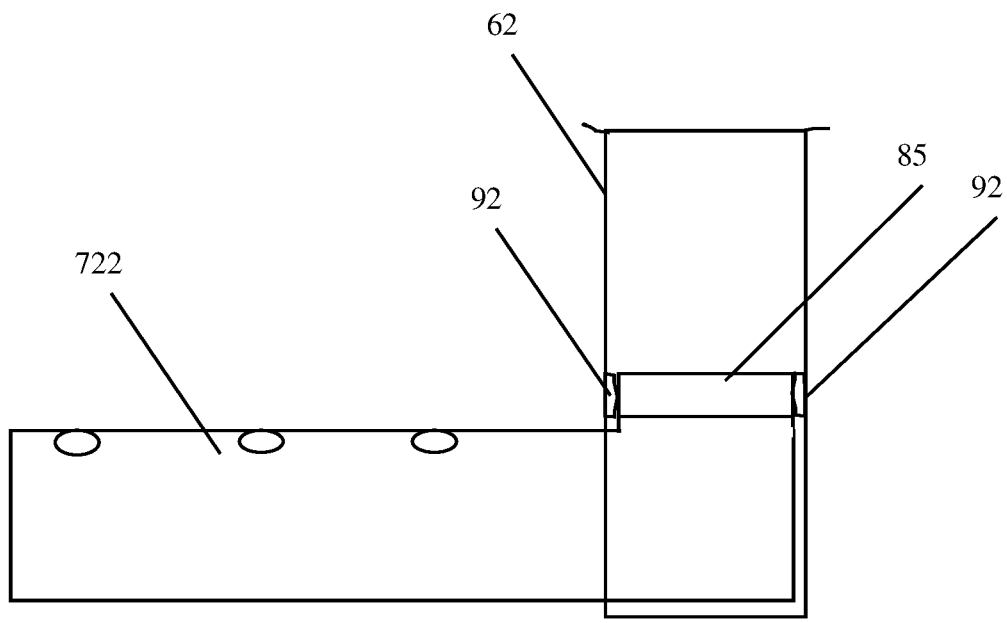
FIG. 23 is a side schematic view of a portion of the present invention showing tabs being used to hold two arms in place when the apparatus is being used to remove the wheel with portions removed away for illustrative purposes.
Figure 24:
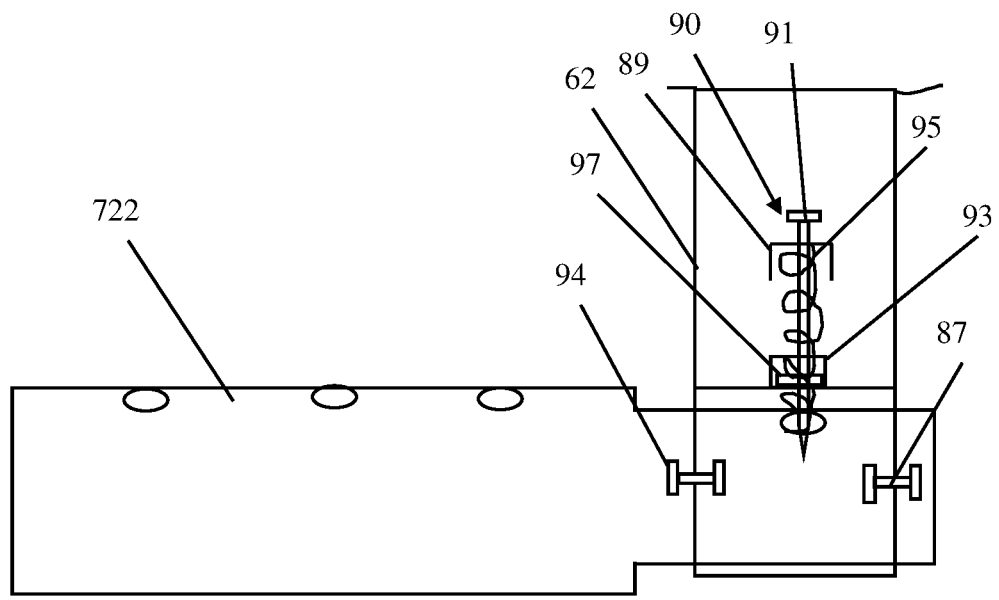
FIG. 24 is a side schematic view of a portion of the present invention showing a pin and spring locking mechanism that holds two arms in place when the apparatus is being used to remove the wheel with portions removed away for illustrative purposes.

FIG. 21 shows a spring clip locking mechanism 86 that holds the arms 62, 72 in place when the apparatus is being used to remove the wheel 82. The locking mechanism may also be of the type that comprises tabs 92. For example, FIG. 23 shows tabs 92 provided in arm 62 that engage an upper projection 85 of arm 722 to hold the arms 62, 722 in place when the apparatus is being used to remove the wheel 82. The locking mechanism 53 may also be a pin and spring locking mechanism 90 as shown in FIG. 24 in which a pin 91 extends through knobs 89, 93, a c shaped lock or c-clip 97, a spring 95 and the arms 62, 72. The knobs 89, 93 are welded to the arm 62 to support the pin 91. The c shaped lock 97 engages the pin 91 and arm 62 to lock them together. The knob 93 covers the c-shaped lock 97 to prevent its removal. FIG. 22 shows pin and spring locking mechanism 90 extending through and holding arms 72, 62 in place when the apparatus is being used to remove the wheel 82.

Figure 25:
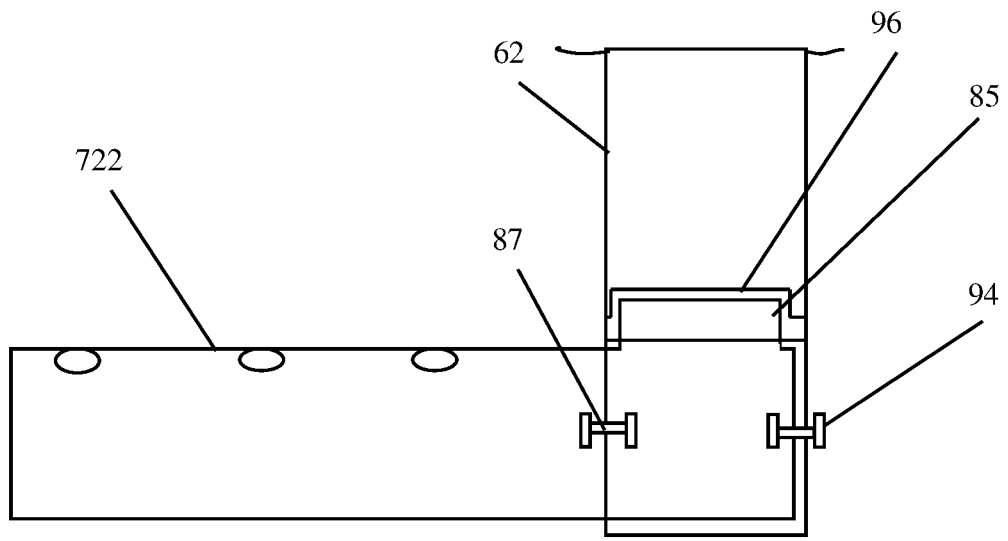
FIG. 25 is a side schematic view of a portion of the present invention showing a spring that holds two arms in place when the apparatus is being used to remove the wheel with portions removed away for illustrative purposes.

In some embodiments, a collapsible or removable arm and/or distal end collapses into itself or another arm (or part). In embodiments exampled in FIGS. 4 and 5, an arm or handle 32 telescopes out of arm 22 and 122 respectively. An arm could swivel/pivot into the bracing structure's void space as well. In FIG. 5, for example, an extension arm 721 collapses or telescopes into arm 722 and arm 722 folds up into the void space within arm 62 for storage. Bolts 87 with lock nuts 94 fastened to them are provided to attach arms 62, 722 together as shown in FIGS. 24 and 25.

Figure 17:
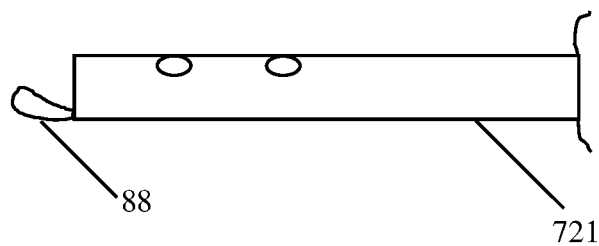
FIG. 17 shows a side view of a tab on an extension arm that is configured for removing the wheel cover from the vehicle wheel
Figure 18:
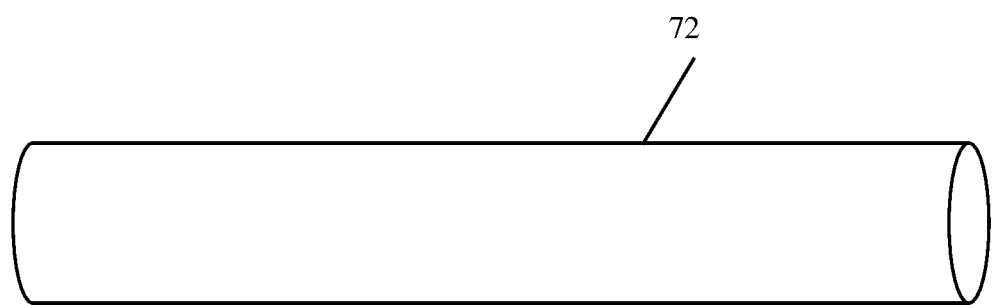
FIG. 18 is a side perspective view of an arm of the present invention that has a rounded or cylindrical shape.
Figure 19:
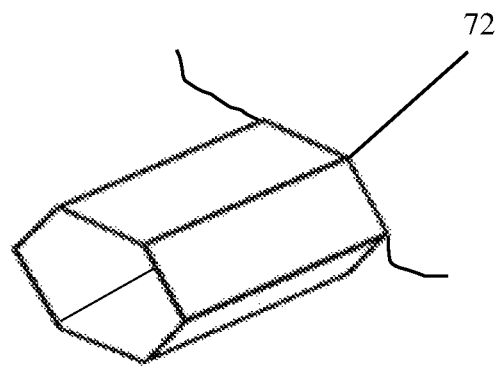
FIG. 19 is a perspective view of a portion of a hexagonally shaped arm of the present invention.

As indicated above, arm 42 has a platform to place one's foot to add body weight to the apparatus and torque for forcing the lug nut loose from the vehicle wheel. This arm 42 is positioned 90 degrees outward relative to the axis of rotation (with which arm 72 or arm 722 are aligned). As seen in FIG. 4, arm 42 may rotate about the axis that is parallel to or coaxial with the longitudinal axis of arm 12 and arm 62 (when arms 12, 62 are unfolded in the operative position of the apparatus) at a maximum of ninety degrees between a first position in which the arm 42 is perpendicular with rotating axis 80 of wheel 82 (when the apparatus is attached to a lug nut or bolt to remove a tire) and a second position in which the arm 42 is parallel to the rotating axis 80 of wheel 82 and extends from the bracing structure 11 in a direction away from the wheel. The bracing structure 11 is configured to allow the platform end to only rotate in one direction relative to the arm 12 from a stowed position of the arm 12. Arm 72 can be cylindrical or rounded (FIG. 18), hexagonal (FIG. 19) or square and is used as a handle. Arm 32's distal end has a telescoping mechanism that allows it to extend and retract into arm 22 or arm 122 for storage. When extended as shown in FIGS. 4 and 5, the arm locks into place such as with a ball and detent mechanism for example. In FIG. 4, arm 22 swivels/pivots, at least partially about the bracing structure 11 so that arm 22 can collapse into the c-channel of arm 12. The arms and/or the bracing structure and/or the platform end may comprise a tab or finger or clip that is configured for removing a wheel cover from the vehicle wheel. For example, FIG. 17 shows tab 88 on extension arm 721 that is configured for removing the wheel cover from the vehicle wheel.

Figure 16:
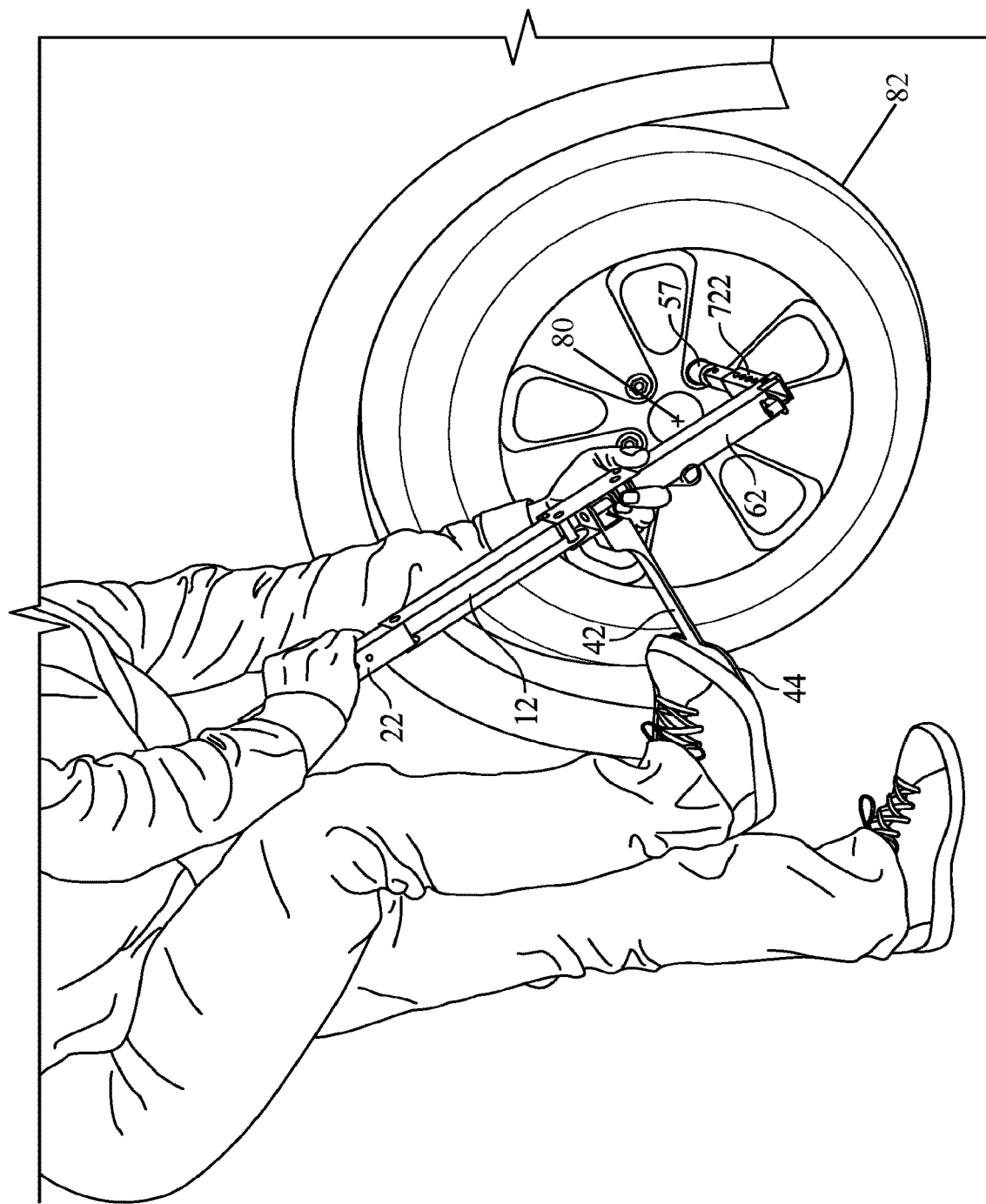
FIG. 16 shows a third alternative embodiment of the apparatus of the invention as it would be appear in use, with the user comfortably placing his (or her) weight on his foot positioned on the platform of the second arm of the apparatus of the invention. In this embodiment shown, the apparatus of the invention has a first arm like that of the embodiment of the apparatus of FIG. 4 and a third arm like that of the embodiment of the apparatus of FIG. 5

The collapsed position of the apparatus of the invention is shown in FIG. 1. When the apparatus is comprised of c-channel, a c-channel arm can have an extension arm that collapses by swiveling/pivoting into the c-channel arm's c-channel void space. Alternatively, a removable extension arm can be removed and nested into a c-channel arm's void space. The middle arm of apparatus of the invention swivels so that it is parallel with the other two primary arms of the apparatus. The bracing structure is sized such that when the apparatus is in the collapsed position, the three arms reside against each other for efficient storage. When folded for storage, the apparatus of the invention in at least one embodiment is less than ten inches in length and two inches in depth, while being greater than three feet in length and one foot in depth when opened and unfolded for use. The platform end is rotatable from a stowed position to an operative position for use. As shown in FIG. 16, the platform end is positioned at an angle of thirty degrees or less relative to a horizontal plane in the operative position when the apparatus engages the lug nut or bolt of the wheel before loosening or tightening the lug nut or bolt. One or more of the arms and/or bracing structure and/or platform end, such as arm 72, may comprise a six sided hexagonal tubing (FIG. 19), rounded tubing (FIG. 18), or four sided tubing (FIG. 4).

In these embodiments, the inner side of the bracing structure 11 faces outwardly or away from the wheel 82 in the direction of the rotating axis 80 of the wheel 82 when the apparatus 10 is being used to remove the wheel 82. Alternatively, the bracing structure 11 can be attached to the apparatus 10 so that the inner side of the bracing structure 11 faces the wheel 82 in the direction of the rotating axis 80 when the apparatus is being used to remove the wheel 82. As illustrated in FIG. 25, a spring 96 is seated inside the arm 62 and fitted over upper projection 85 of the arm 722 located inside the arm 62. L-shaped ends of the spring 96 extend into the gaps located between the upper projection 85 and inner side of the arm 62 and can slide up and down by a user's hand. When the apparatus 10 is unfolded for use, the spring 96 goes around the side of arm 722, which is bent ninety degrees and holds and locks it during use. The spring 96 may be made of metal or plastic or other suitable material.

The second extension arm has a length ranging from one inch to thirty inches. The apparatus is less than ten inches in length when folded for storage, as measured from its longest or widest point. The apparatus is greater than three feet in length when opened and unfolded for proper use. The apparatus is greater than one inch in depth when opened and unfolded for proper use with the dimension of depth measured as the distance from the outer most edge of the apparatus that is in contact with the lug nut or bolt, extending to the furthest point away from the vehicle's wheel. At least one of the arms or the bracing structure or the platform end is comprised of c-channel. The platform end may be comprised of any one of multiple different potential shapes and sizes of the platform end, in order to properly accommodate safe and efficient usage of the apparatus, by any and all different size and strength levels of users. At least one of the arms or the bracing structure or the platform end has a backstop mechanism to prevent over rotation of any one of the parts in relation to at least one of the other said parts of the apparatus.

The previously described embodiments of the invention have many advantages, including satisfying the need for a user to generate enough torque to loosen or tighten lug nuts while maintaining his or her balance and footing when using the apparatus. The invention enables the user to generate greater torque by standing or putting weight on an arm of the invention with a platform for the user's foot, at a position and height that enables the user to maintain his or her balance, which is further aided by enabling the user to comfortably grasp a handle or arm of the invention.

While preferred embodiments of the present disclosure have been described, it should be understood that other various changes, adaptations, and modifications can be made therein without departing from the spirit of the invention(s) and the scope of the appended claims. The scope of the present disclosure should, therefore, be determined not with reference to the above description, but instead should be determined with reference to the appended claims along with their full scope of equivalents. Furthermore, it should be understood that the appended claims do not necessarily comprise the broadest scope of the invention(s) that the applicant is entitled to claim, or the only manner(s) in which the invention(s) may be claimed.

What is claimed is:

1. An apparatus for loosening or tightening lug nuts or bolts from a wheel of a vehicle, the apparatus comprising:
    a bracing structure;
    a first foldable arm connected to said bracing structure;
    a first extension arm connected to said first foldable arm, said first extension arm capable of being folded;
    a second arm connected to said bracing structure, wherein said second arm has a platform end;
    said platform end being sized to support a foot of a user during usage of the apparatus by the user; and
    said platform end being rotatable from a stowed position to an operative position for use, wherein said platform end is positioned at an angle of thirty degrees or less relative to a horizontal plane in said operative position when the apparatus engages the lug nut or bolt of the wheel before loosening or tightening the lug nut or bolt.

2. The apparatus of claim 1, wherein said bracing structure is configured to allow said platform end to only rotate in one direction relative to the first foldable arm from said stowed position, wherein the maximum amount of rotation of said platform end relative to the first foldable arm is ninety degrees.

3. The apparatus of claim 1, further comprising a third foldable arm connected to said bracing structure.

4. The apparatus of claim 3, further comprising a second extension arm connected to said third foldable arm, wherein said second extension arm includes an assortment of different sized adapters for receiving correspondingly different sized lug nuts or bolt.

5. The apparatus of claim 4, wherein said second extension arm has a length ranging from one inch to thirty inches.

6. The apparatus of claim 4, wherein at least one of said arms or said bracing structure or said platform comprises a tab or finger or clip that is configured for removing a wheel cover from a vehicle wheel.

7. The apparatus of claim 4, wherein at least one of said arms has a locking mechanism configured for holding said arm in the proper position while the apparatus is in use.

8. The apparatus of claim 7, wherein at least one of said locking mechanisms comprises a ball bearing.

9. The apparatus of claim 7, wherein, at least one of said locking mechanisms comprises a pin.

10. The apparatus of claim 7, wherein at least one of said locking mechanisms comprises a spring clip.

11. The apparatus of claim 7, wherein at least one of said locking mechanisms comprises a tab.

12. The apparatus of claim 3, wherein the apparatus is greater than three feet in length when opened and unfolded for proper use.

13. The apparatus of claim 3, wherein at least one of said arms or said bracing structure or said platform has a back-stop mechanism to prevent over rotation of any one of said parts in relation to at least one of the other said parts of the apparatus.

14. The apparatus of claim 1, wherein the apparatus is less than ten inches in length when folded for storage, as measured from its longest or widest point.

15. The apparatus of claim 1, wherein the apparatus is greater than one inch in depth when opened and unfolded for proper use with the dimension of depth measured as the distance from the outer most edge of the apparatus that is in contact with the lug nut or bolt, extending to the furthest point away from the vehicle's wheel.

16. The apparatus of claim 1, wherein at least one of said arms or said bracing structure or said platform end is comprised of c-channel.

17. The apparatus of claim 1, wherein at least one of said arms or said bracing structure or said platform end is comprised of rounded tubing.

18. The apparatus of claim 1, wherein at least one of said arms or said bracing structure or said platform end is comprised of four sided tubing.

19. The apparatus of claim 1, wherein at least one of said arms or said bracing structure or said platform end is comprised of six sided tubing.

20. The apparatus of claim 1, wherein said platform end is comprised of any one of multiple different potential shapes and sizes of said platform end, in order to properly accommodate safe and efficient usage of the apparatus, by any and all different size and strength levels of users.

* * * * *